United States Patent
Matsuo et al.

(10) Patent No.: US 8,403,638 B2
(45) Date of Patent: Mar. 26, 2013

(54) WIND POWER GENERATOR

(75) Inventors: Takeshi Matsuo, Tokyo (JP); Shinichi Miyamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/178,018

(22) Filed: Jul. 7, 2011

(65) Prior Publication Data
US 2012/0001437 A1 Jan. 5, 2012

Related U.S. Application Data

(63) Continuation of application No. PCT/JP2011/061739, filed on May 23, 2011.

(30) Foreign Application Priority Data

Jun. 30, 2010 (JP) ................................. 2010-149098

(51) Int. Cl.
*F03D 9/00* (2006.01)

(52) U.S. Cl. .......................... 415/177; 415/178; 415/200

(58) Field of Classification Search .................. 415/177, 415/178, 200
See application file for complete search history.

(56) References Cited

U.S. PATENT DOCUMENTS

| | | | |
|---|---|---|---|
| 4,299,198 A * | 11/1981 | Woodhull | 415/4.3 |
| 6,483,199 B2 * | 11/2002 | Umemoto et al. | 290/55 |
| 7,033,139 B2 * | 4/2006 | Wobben | 415/178 |
| 7,427,814 B2 * | 9/2008 | Bagepalli et al. | 290/55 |
| 2010/0148514 A1 | 6/2010 | Sato et al. | |

FOREIGN PATENT DOCUMENTS

| | | |
|---|---|---|
| JP | 2002-013467 A | 1/2002 |
| JP | 2004-525600 A | 8/2004 |
| JP | 2009-091929 A | 4/2009 |

OTHER PUBLICATIONS

International Search Report for PCT/JP2011/061739 mailed Sep. 8, 2011.

* cited by examiner

*Primary Examiner* — Igor Kershteyn
(74) *Attorney, Agent, or Firm* — Kanesaka Berner & Partners LLP

(57) ABSTRACT

Provided is a wind power generator that reduces the amount of heat input into a nacelle from the outside of the nacelle due to the solar radiation, and that improves the heat dissipation performance from the inside of the nacelle to the outside air. In a wind power generator in which a driving mechanism and power generation mechanism that are connected with a rotor head, to which wind-turbine blades are attached, are accommodated and installed in a nacelle, an outer wall surface of the nacelle is provided with, on at least a part of the wall surface where no direct sunlight is radiated, a heat-dissipation-resistance reducing portion that uses a member having a higher thermal conductivity than that of a peripheral wall member.

5 Claims, 6 Drawing Sheets

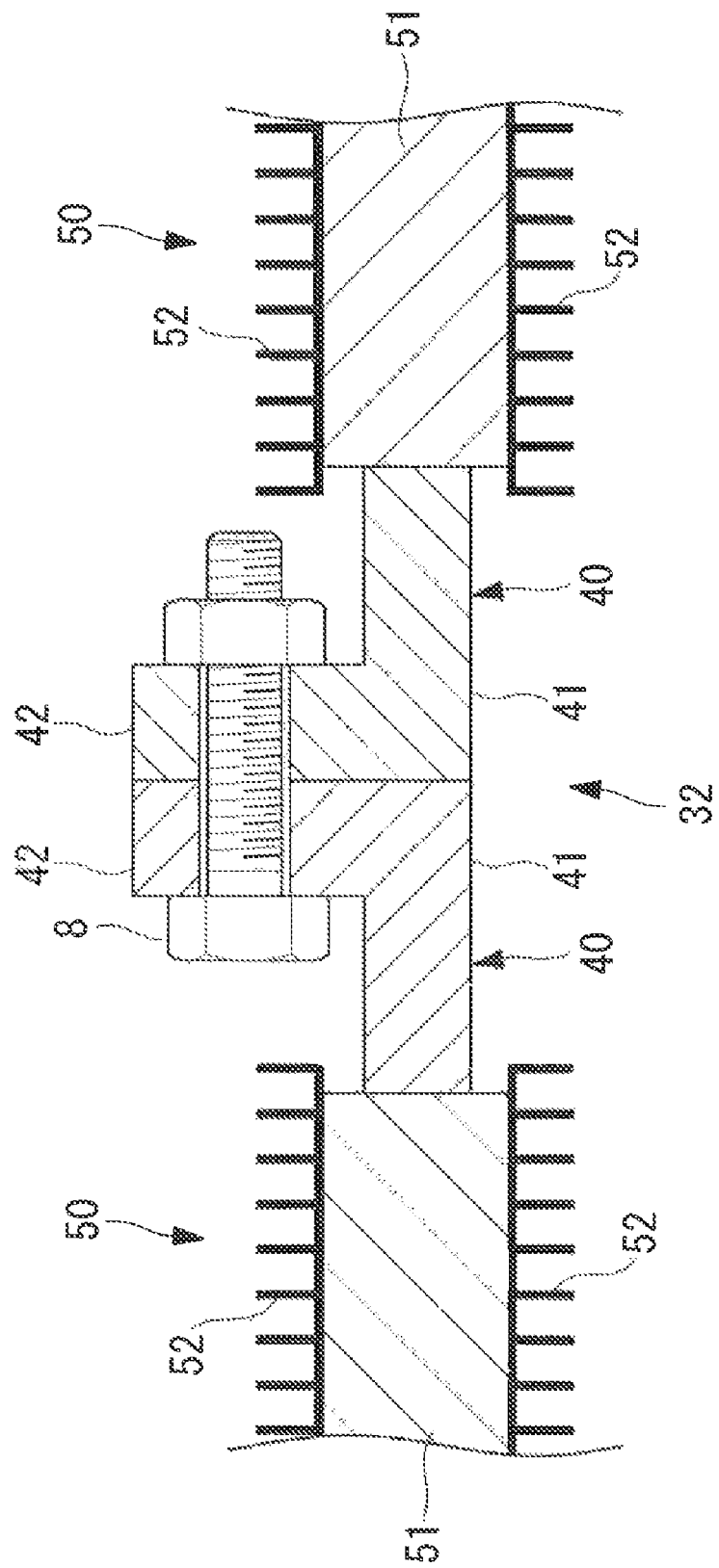

WIND POWER GENERATOR

CROSS REFERENCE TO RELATED APPLICATIONS

This application is a continuation application of PCT/JP2011/061739 filed on May 23, 2011 and claims the benefit of Japanese Application No. 2010-149098 filed in Japan on Jun. 30, 2010, the entire contents of each of which are hereby incorporated by their reference.

TECHNICAL FIELD

The present invention relates to a wind power generator that generates electricity upon receiving wind force on wind-turbine blades; and in particular, to cooling of equipment installed in a nacelle of a wind power generator.

BACKGROUND ART

A wind power generator (hereinafter referred to as "wind turbine") is a device in which a rotor head equipped with wind-turbine blades rotates upon receiving wind force, and in which a generator driven by, for example, accelerating this rotation with a gear box generates electricity.

The above-described rotor head is attached at an end portion of a nacelle, which is generally installed on top of a wind turbine tower (hereinafter referred to as "tower") in a manner that allows yawing, and is supported so as to be rotatable about a substantially horizontal, lateral rotation axis.

As a general device configuration, a device for transmitting a mechanical rotational force that is received from the wind-turbine blades and a power generator are installed inside the nacelle of the wind, power generator. Among those, the rotational-force transmission device is provided with a main bearing and a gear box, and the power generator is provided with a generator, a transformer, an inverter, and a control panel, or is provided with a generator and a control panel.

Such equipment in the nacelle is cooled by using outside air that is sucked in through a nacelle air inlet, performing heat exchange between the outside air and a coolant with individual heat, exchangers, which are installed on each piece of equipment serving as a heat source, and supplying the coolant, whose heat has been absorbed by the outside air, to the equipment to be cooled. In this case, the outside air to be sucked into the nacelle is generally subjected to salt removal treatment and dust removal treatment through a filter.

As a conventional example employing heat exchange between the outside air and the coolant, specific examples of each piece of equipment releasing heat are illustrated in FIGS. 6A and 6B. In FIGS. 6A and 6B, reference sign 1 in the figure designates a wind power generator, 2 designates a tower, 3 designates a nacelle, 4 designates a rotor head, 5 designates wind-turbine blades, 6 designates a nacelle air inlet, and 7 designates an air outlet.

In addition, FIG. 6B is an enlarged, view of relevant portions of a wall surface structure of the nacelle 3. The nacelle wall surface of the general nacelle structure has an outside wall structure that is formed by connecting a plurality of separated wall members 3a, which are made of fiber reinforced plastic (hereinafter referred to as "FRP"), and a structure in which flange parts 3b provided inside the nacelle are connected with bolts and nuts 8 is employed.

With such a wind power generator 1, cooling of a main bearing 9 and a gear box 10, which constitute mechanical transmission devices, is achieved by using lubricating oil, which circulates through a lubricating oil circulatory system, as the coolant for heat exchange with the outside air. In this case, heat exchange between the lubricating oil and the outside air is performed in an oil cooler 11, and lubrication and cooling of frictional heat are achieved by supplying the lubricating oil that, has been cooled due to the heat absorption with the outside air to rotating parts.

On the other hand, for cooling the electrical apparatuses that are heat releasing sources, for instance, in the case of an inverter control panel 12, antifreeze is used as the coolant for heat exchange with the outside air, and in the case of a generator 13, primary air is used as the coolant for heat exchange with the outside air. In both cases, continuous cooling is achieved by supplying and circulating the antifreeze or the primary air, whose heat has been absorbed by the outside air, to electrical apparatuses that are heat sources to be cooled. Reference sign 14 in this figure designates a transformer.

The above-described outside air flows into the nacelle 3 through the nacelle air inlet 6 by operating a fan 15. This outside air flows within the nacelle 3 to exchange heat with various types of coolants, and to ventilate and cool the inside of the nacelle, and after that, the outside air flows out through the air outlet 7.

In addition, the following PTL 1 discloses a wind power generator that is provided with heat dissipating fins for dissipating heat to the outside air from a rotor hub through a cover.

CITATION LIST

{Patent Literature}
{PTL 1} Japanese Unexamined Patent Application, Publication No. 2009-091929

SUMMARY OF INVENTION

Technical Problem

In the above-described wind power generator 1, if a summer day temperature (for instance, 40° C.) is set as the most severe outside air temperature condition through the year, because the upper environmental temperature limit of general electronic equipment is about 50° C., the temperature difference between the inside and the outside of the nacelle 3 is required to be controlled within 10° C. or less.

To describe this more specifically, the solar constant (the amount of incoming solar energy per unit area incident on the surface of the earth's atmosphere perpendicularly) is about 1370 W/m$^2$, and thus, by assuming that the top surface and the side surfaces of the nacelle 3 form a substantially cuboid shape having a heat receiving area of 80 m$^2$ (nacelle height of 4 m, nacelle width of 4 m, and nacelle length of 5 m), the amount of heat input to the wall surface of the nacelle 3 from, the sun will be about 77 kW at an atmospheric transmittance of 0.7.

On the other hand, when the heat loss in the wind power generator 1 is assumed to be about 10 to 15% of the generated output power, with the wind power generator 1 having a rated generated output power of 2500 kW, the total heat loss will be about 250 to 375 kW. Adding the amount of heat input from the sunlight to this total heat, loss, the required, cooling capacity in the nacelle 3 is increased, to about 327 to 452 kW. That is to say, by adding the amount of heat input from, the sunlight, the total heat loss from the nacelle 3 will be increased, to 120 to 131% relative to the total heat loss without taking the sunlight, into consideration.

In general, when the wall surface of the nacelle 3 is made of FRP, because the thickness of the wall surface (plate thickness) is as much as about 100 mm, the thermal insulance of the FRP becomes the dominant factor, and therefore, the effect of the heat input from the sunlight can be negligible in many cases.

On the other hand, the larger the wall surface thermal insulance of the nacelle 3 is, the lower the heat-dissipation resistance through the wall surface of the nacelle 3 becomes, and therefore, the larger the temperature difference between the air in the nacelle 3 and the outside air becomes. In particular, during daytime in the summer when the effect of the solar heat is large, there is a risk that the air temperature in the nacelle 3 will exceed the upper limit of the electronic equipment environmental temperature. Because the lifetime of the electronic equipment installed inside the nacelle 3 is shortened, such a temperature environment in the nacelle 3 is undesirable.

That is to say, with the nacelle 3 of the wind power generator 1, by making the plate thickness of the wall surface thinner, the heat-dissipation resistance is reduced to improve the heat dissipation performance. However, because this makes the input-heat resistance of the wall surface smaller at the same time, the amount of heat input into the nacelle 3 from the sunlight is increased. Therefore, particularly during daytime in summer, because the air temperature of the nacelle 3 tends to exceed the upper environmental temperature limit of the electronic equipment, which causes the lifetime of the electronic equipment to be shortened, as in the case where the plate thickness is thick, it is undesirable for the wall surface of the nacelle 3 to have a small plate thickness.

As described above, in the nacelle 3 of the wind power generator 1, the input-heat resistance and the heat-dissipation resistance of the wall surface are in an inverse relationship, and therefore, it is difficult to optimize the plate thickness of the nacelle wall surface, such that only the heat dissipation performance through the wall surface of the nacelle 3 from the inside of the nacelle 3 to the outside air is improved in order to maintain a suitable air temperature in the nacelle 3.

The present invention has been conceived in light of the circumstances described above, and an object thereof is to provide a wind power generator in which the amount of heat that is input into a nacelle from outside the nacelle due to the solar radiation is suppressed, and in which the heat dissipation performance from the inside of the nacelle to the outside air is improved.

Solution to Problem

In order to solve the problems described above, the present invention employs the following solutions.

A wind power generator according to the present invention is a wind power generator in which a driving mechanism and power generation mechanism linked with a rotor head, to which wind-turbine blades are attached, are accommodated and installed in a nacelle, wherein an outer wall surface of the nacelle is provided with, on at least a part of the wall surface where no direct sunlight is radiated, a heat-dissipation-resistance reducing portion that uses a member having a higher thermal conductivity than that of a peripheral wall member.

According to such a wind power generator, because the outer wall surface of the nacelle is provided with, on at least a part of the wall surface where no direct sunlight is radiated, the heat-dissipation-resistance reducing portion that uses the member having a higher thermal conductivity than that of peripheral wall member, the peripheral wall member where direct sunlight is radiated has a relatively low thermal conductivity, and thus, it is possible to suppress the amount of heat input to the nacelle, and at the same time, because the heat-dissipation-resistance reducing portion where no direct sunlight is radiated has a relatively high thermal conductivity, only the heat dissipation performance from the inside of the nacelle to the outside air is improved. That is to say, because the heat-dissipation-resistance reducing portion is installed at a location (bottom surface etc.) where no direct sunlight is radiated, even if a member having a high thermal conductivity is used, the amount of heat input into the nacelle due to the solar heat will not be increased, and it is possible to efficiently dissipate the heat inside the nacelle to the outside air through the high-thermal-conductive member.

In the above-mentioned wind power generator, the heat-dissipation-resistance reducing portion may be provided with a fin that is attached on at least one of the surfaces, and thereby, the heat dissipation performance can be improved furthermore.

In the above-mentioned wind power generator, the heat-dissipation-resistance reducing portion may be provided with heat transport means that is linked with a heat source installed in the nacelle and carries heat therebetween, and thereby, heat can be dissipated efficiently from a high-temperature heat source to the outside air.

In the above-mentioned wind power generator, the heat-dissipation-resistance reducing portion may be formed into a wave-like shape, and thereby, it is possible to ensure necessary rigidities even if the plate thickness of the member is made thinner in order to save weight, and at the same time, it is possible to increase the heat transporting surface area to the outside air.

ADVANTAGEOUS EFFECTS OF INVENTION

According to the present, invention described above, by providing a heat-dissipation-resistance reducing portion on an outer wall, surface of a nacelle, it is possible to reduce the amount of heat input to the nacelle from the outside of the nacelle due to solar radiation, and to improve the heat dissipation performance from the inside of the nacelle to the outside air. Therefore, the air temperature inside the nacelle is maintained so as not to exceed the upper environmental temperature limit of the electronic equipment by suppressing the temperature rise even in an operating state where the amount of heat input from the sunlight is high, for example, during a sunny day in summer. Accordingly, the electronic equipment installed in the nacelle can be operated under a suitable temperature environment that dose not exceed, the upper environmental temperature limit of the electronic equipment, and thus, reliability and durability are improved to achieve long lifetime.

In addition, because the temperature rise of the internal air in the nacelle is suppressed, for example, it is possible to reduce the capacity of heat exchanger that cools the coolant, such as lubricating oil, antifreeze, primary air, and so forth, with the outside air. Because such a reduction in size of the heat exchanger is also effective for reducing the amount of outside air required for the heat exchange, it is possible to reduce the power of an electric motor required for driving the fan that introduces the outside air, and to improve the power generating efficiency of the wind power generator as a whole.

BRIEF DESCRIPTION OF DRAWINGS

FIG. 2 is a sectional view taken along B-B in FIG. 1B (the wall surface cross-sectional structure of the nacelle).

DESCRIPTION OF EMBODIMENTS

An embodiment of a wind power generator according to the present invention will be described below with reference to the drawings.

Figure 1A:
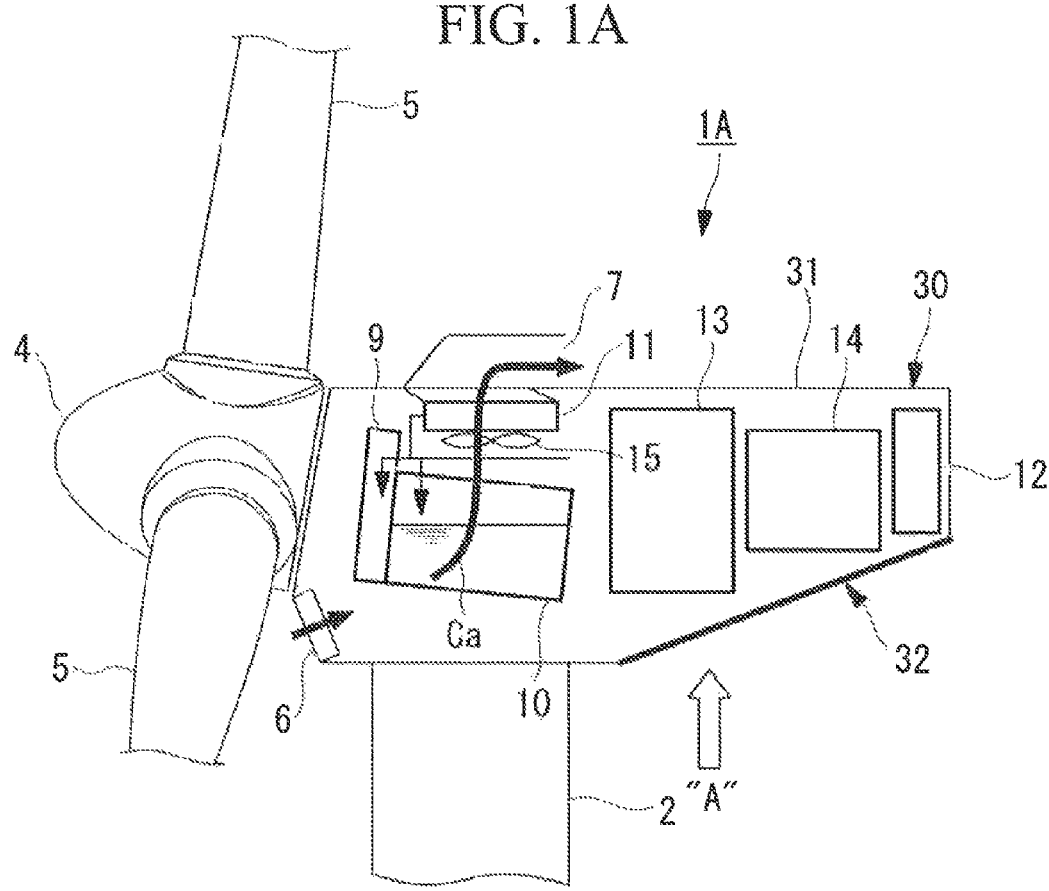
FIG. 1A is a view showing an embodiment of a wind power generator according to the present invention, and is a sectional view of relevant, portions showing, in outline, an example internal configuration of a nacelle.

In FIG. 1A, a wind power generator 1A includes a tower 2 erected upright on a base, a nacelle 30 provided at the top of the tower 2, and a rotor head 4 provided on the nacelle 30 so as to be rotatable about a substantially horizontal axis.

A plurality of (for example three) wind-turbine blades 5 are attached to the rotor head 4 in a radiating pattern around a rotational axis thereof. Accordingly, the force of wind striking the wind turbine blades 5 from, the rotational axis direction, of the rotor head 4 is converted to a motive force that causes the rotor head 4 to rotate about its rotational axis. The illustrated wind power generator 1A is of a so-called upwind type in which the wind-turbine blades 5 rotate in front of the nacelle 30. However, the type of the wind power generator 1A is not limited thereto, and, for instance, the present invention described below can be applied to a downwind type.

In the nacelle 30, a main bearing 9 and a gear box 10 are provided as a mechanical-driving-force transmitting mechanism that transmits the rotation of the rotor head 4 to a generator 13. Furthermore, an inverter control panel 12, a transformer 14 that transform the electric power generated by the generator 13, and so forth are installed in the nacelle 30 as various types of electrical, apparatuses that constitute a power generation mechanism with the generator 13.

In this way, in the wind power generator 1A, a driving mechanism/power generation mechanism, which are linked to the rotor head 4, to which the wind-turbine blades 5 are attached, are accommodated and installed inside the nacelle 30. Such driving/power generation mechanisms include equipment that generates heat while operating.

The nacelle 30 is a hollow member having a substantially cuboid form, in which a cover member 31 covers around a nacelle base plate and frame components (not shown). The cover member 31 is, for example, a plate-like member made of a fiber reinforced plastic (FRP), and this cover member 31 forms the outer wall of the nacelle 30.

A nacelle air inlet 6 formed in the cover member 31 is provided at the bottom of the front end face of the nacelle 30 for introducing the outside air into the nacelle 30 for cooling. A filter having salt removal and dust removal functions is attached to this nacelle air inlet 6. In addition, in order to allow the cooling outside air that has been circulated inside the nacelle 30 to flow out to the atmosphere, an air outlet 7 having a rain guard attached to the opening of the cover member 31 is provided in the top surface of the nacelle 30.

The outside air that is introduced through the nacelle air inlet 6 by the operation of a fan 15 is used for heat exchange etc. with a coolant that cools heat-releasing equipment installed inside the nacelle 30, and thereafter, the warmed outside air is discharged to the atmosphere from the air outlet 7.

In the illustrated example configuration, an oil cooler 11 that uses the lubricating oil of the main bearing 9 and the gear box 10 as the coolant and that achieves cooling by heat exchange between the lubricating oil and the outside air is illustrated. However, as described in the Background Art, the actual nacelle 30 is provided, with various types of heat exchangers (not shown) in order to perform heat exchange between the outside air and the coolant that are used for cooling the inverter control panel 12, the generator 13, and so forth.

An arrow Ca in the figure shows an example of the main flow of outside air. The actual flow of the outside air flows so as to circulate within the nacelle 30 depending on the arrangement etc. of the heat exchangers installed in the nacelle 30.

The outer wall surface of such a nacelle 30 is provided with, on at least a part of the wall surface where no direct sunlight is radiated, a heat-dissipation-resistance reducing portion 50 formed of a member (high-thermal-conductivity member) having a higher thermal conductivity than that of a peripheral wall member. In the outer wall surface of the nacelle 30, the wall surface where no direct sunlight is radiated includes, for example, a bottom surface portion (a lower surface towards the tower 2) 32 having a substantially cuboid form.

In the illustrated example, the structure is formed by connecting a plurality of separate cover members 31 that form the outer wall surface of the nacelle 30. The heat-dissipation-resistance reducing portion 50 formed of a high-thermal-conductive member is provided on bottom-surface cover members 40 that is attached to the bottom surface portion 32. This heat-dissipation-resistance reducing portion 50 is desirably provided over the largest possible region on the bottom surface portion 32, excluding the connection part to the tower 2.

Figure 1B:
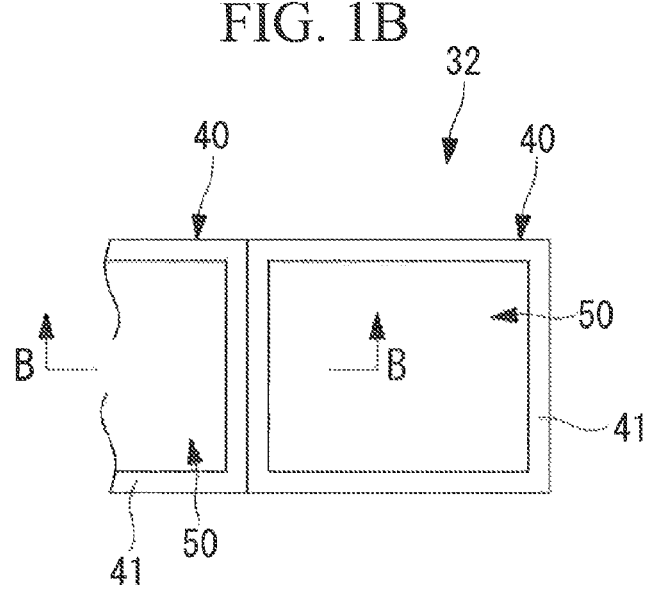
FIG. 1B is a view showing an embodiment of a wind power generator according to the present invention, and is a view taken along arrow A in FIG. 1A.

FIG. 1B is a bottom view showing the bottom surface of the nacelle 30 from the ground (view taken along arrow A in FIG. 1A). In the figure, the bottom-surface cover members 40 attached to the bottom surface portion 32 are provided with, on a central portion excluding a peripheral frame 41, the heat-dissipation-resistance reducing portion 50 formed of the high-thermal-conductive member. In this case, although the heat-dissipation-resistance reducing portion 50 has a non-separated monolithic structure, for instance, a multi-part separated structure may be formed by forming a frame within the peripheral frame 41 etc.

Although the illustrated bottom surface portion 32 has a structure in which a plurality of separated cover members 40 are connected, one integral cover member 40 may be used depending on the size of the nacelle 30 etc.

FIG. 2 is a sectional view of relevant portions showing a cross-sectional structure (cross-section along B-B in FIG. 1B) of a connection part in the bottom surface portion 32 formed by connecting a plurality of bottom-surface cover members 40. These bottom-surface cover members 40 are each provided with the heat-dissipation-resistance reducing portion 50 that is held at the inner side of the peripheral frame 41 made of FRP and a flange parts 42 that are provided by bending the end portion of the peripheral frame 41 towards the inside of the nacelle 30. The flange parts 42 are used in the connecting part between the adjacent bottom-surface cover members 40 or between the adjacent cover members 31, for connecting and integrating them with nuts and bolts 8.

The above-described heat-dissipation-resistance reducing portion 50 will be explained in detail below.

The heat-dissipation-resistance reducing portion 50 is provided with a member having a higher thermal conductivity than a peripheral wall member made of FRP etc. on the outer-wall surface of the nacelle 30 where no direct sunlight is radiated. For example, a metal plate 51 may be held in the central portion of the peripheral frame 41 by impregnating the metal plate 51 having a high thermal conductivity in the peripheral frame 41 made of FRP, and curing it.

In this case, the metal whose thermal conductivity is higher than that of the FRP of the peripheral wall member includes, for example, copper, aluminium, duralumin, and so forth. However, no limitation is imposed on its material so long as it is more thermally conductive and lighter than the peripheral wall member.

In addition, the high-thermal conductive member that is impregnated in the bottom-surface cover member 40 made of FRP is not limited to the above-described metal plate 51, and for example, high-thermal-conductive resin (for example, epoxy resin etc,) may be employed. The high-thermal-conductive resin in this case includes, for example, those made to have a thermal conductivity close to that of high-thermal-conductive metal by impregnating nigh-thermal-conductive fibers, such as glass fibers, carbon, and so forth, into, for example, epoxy resin etc., and at the same time, by increasing the number of connecting points between the fibers compared with general fiber-reinforced plastic.

As described above, by employing the bottom-surface cover members 40 that are provided with, the heat-dissipation-resistance reducing portion 50 on the nacelle outer wall surface where no direct sunlight is radiated, because the thermal conductivity of the heat-dissipation-resistance reducing portion 50 is high, the thermal insulation is reduced in the wall surface in which the bottom-surface cover members 40 are installed. That is to say, because the outer wall surface of the nacelle 30 is provided with the heat-dissipation-resistance reducing portion 50 that has a higher thermal conductivity than the peripheral wall member on at least a part of the outer wall surface, where no direct sunlight is radiated, as in, for example, the bottom surface portion 32, the thermal conductivity of the peripheral wall member made of FRP etc., where direct sunlight is radiated, becomes relatively low, and at the same time, the thermal conductivity of the heat-dissipation-resistance reducing portion 50, where no direct sunlight is radiated, becomes relatively high. In addition, in order to improve the heat dissipation performance, it is generally preferred to orientate the fibers in the FRP such that the thermal conductivity is higher in the thickness-wise direction.

Accordingly, in the nacelle wall surface made of FRP etc., it is possible to suppress the amount of heat input to the nacelle 30 due to solar radiation, and at the same time, with the heat-dissipation-resistance reducing portion 50, where no sunlight is radiated, regardless of the high thermal conductivity, because no direct sunlight is radiated thereon, the amount of heat input due to the sunlight is small, and only the heat dissipation performance from the inside of the nacelle 30 to the outside air is improved.

In other words, because the heat-dissipation-resistance reducing portion 50 is installed at the location where no direct sunlight is radiated, as in the bottom surface portion 32, the amount of solar heat input to the nacelle 30 does not increase even if a member having a high thermal conductivity is used; therefore, it is possible to dissipate the heat to the outside air efficiently from the inside of the nacelle 30 through the high-thermal-conductive member that is installed as the heat-dissipation-resistance reducing portion 50.

In addition, the above-described heat-dissipation-resistance reducing portion 50 of the wind power generator 1 is preferably provided with fins 52 on at least one side thereof. These fins 52 improve the heat dissipation performance by increasing the contact surface area with the air inside the nacelle 30 and with the outside air, and are attached so as to protrude from, the surface of the high-thermal-conductivity member, such as the above-mentioned metal plate 51 etc.

Although such fins 52 may be attached on only one side of the heat-dissipation-resistance reducing portion 50, that is either the side in contact with the air inside the nacelle 30 or the side in contact with the outside air, in a more preferable embodiment, as show in FIG. 2, it is preferable to improve the heat dissipation performance even more by providing the fins 52 on both sides of the heat-dissipation-resistance reducing portion 50.

Figure 3:
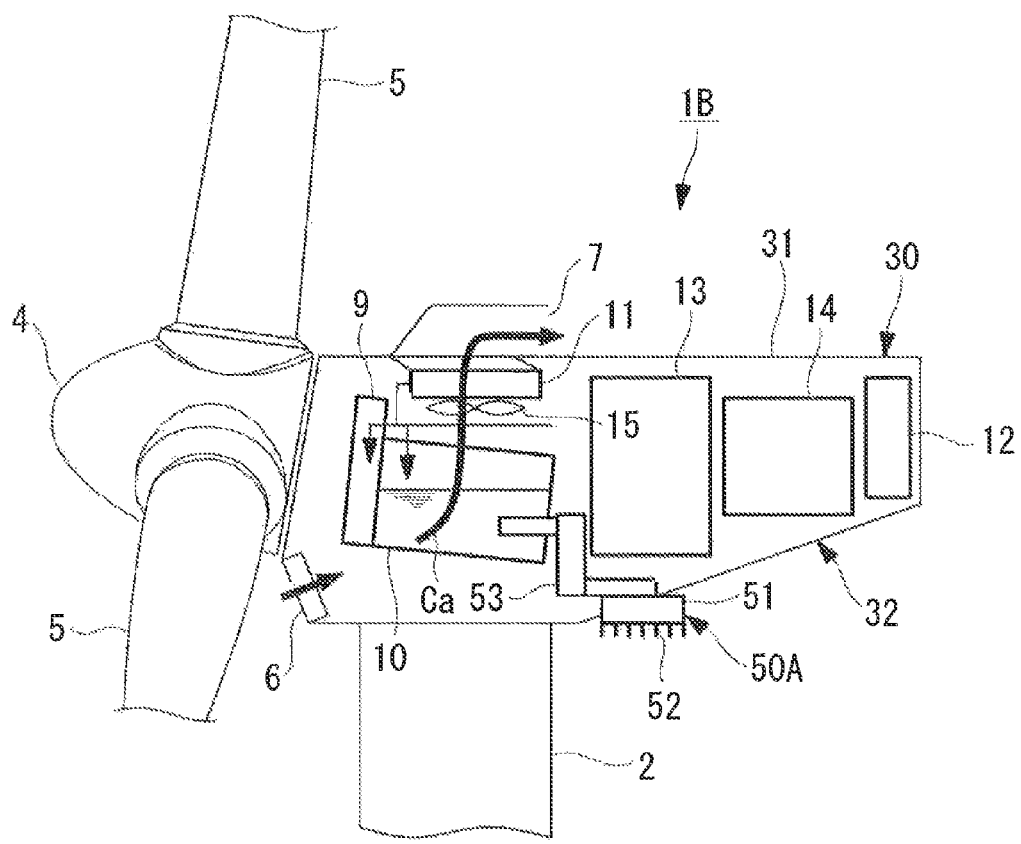
FIG. 3 is a sectional view of relevant portions showing, in outline, an example internal configuration of a nacelle as a first modification of a wind power generator according to the present invention.
Figure 4:
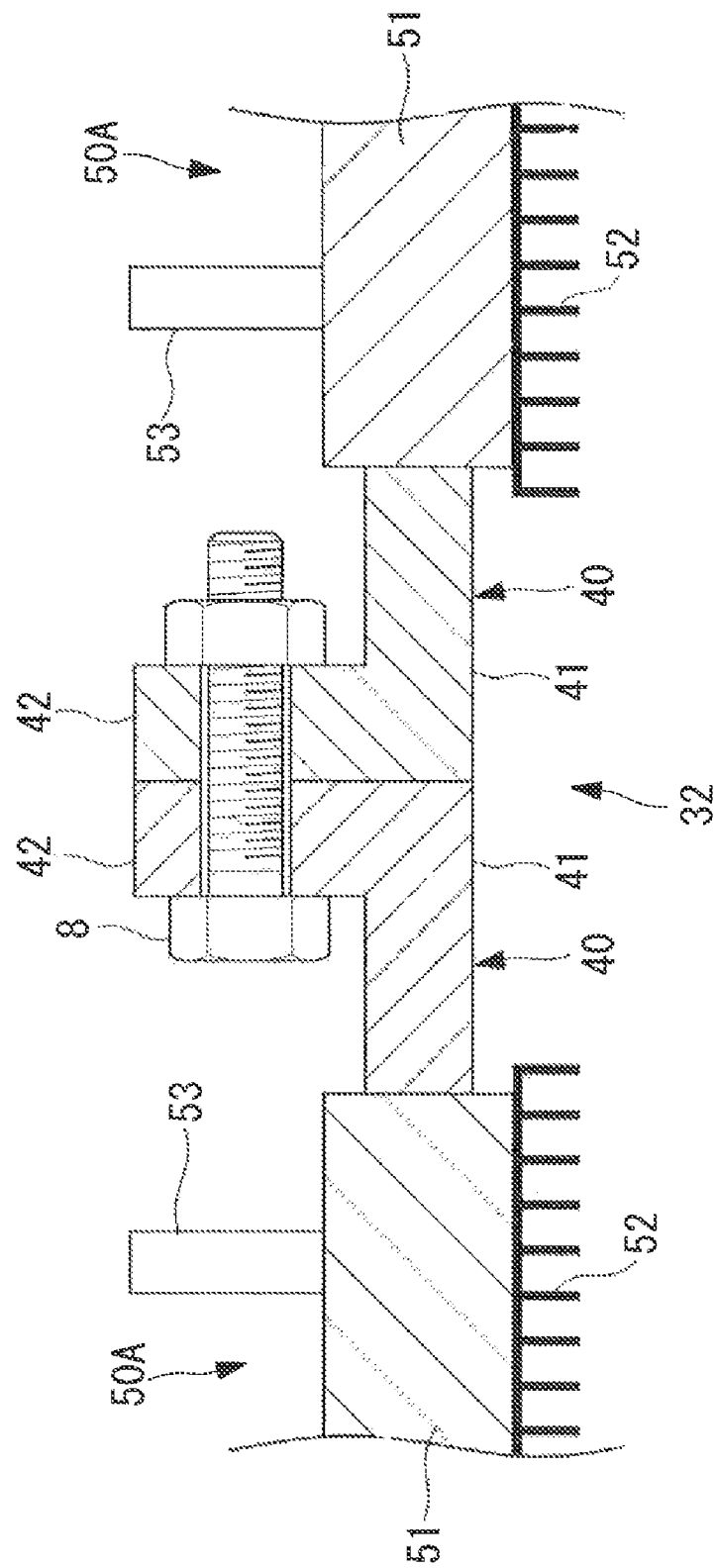
FIG. 4 is a sectional view showing the wall surface cross-sectional structure of a nacelle in the wind power generator shown in FIG. 3.

Next, a first, modification of the above-described wind power generator 1A will be explained with reference to FIGS. 3 and 4. Parts similar to those in the above-described embodiment are assigned the same reference numerals, and a detailed description thereof will be omitted.

In the wind power generator 1B in the first modification, a heat-dissipation-resistance reducing portion 50A is provided with a heat transport member 53 that is joined to the heat source, such as the gear box 10 etc., installed in the nacelle 30, and that guides and carries the heat from the high-temperature side to the low-temperature side. That is to say, this is a configuration example in which heat is transported from, the high-temperature heat source that is installed in the nacelle 30 to the metal plate 51 of the heat-dissipation-resistance reducing portion 50A provided on the outer wall surface of the nacelle 30 through the heat transport member 53, and the heat is dissipated from the surface of the high-thermal-conductivity member, such as the metal plate 51 etc., to the outside air, which is the low-temperature side. In this case, the fins 52 are attached only on the outside-air-side surface of the high-thermal-conductivity member, such as the metal plate 51 etc.; however the configuration is not limited thereto. The heat-dissipation-resistance reducing portion 50A may be provided over the whole bottom surface portion 32 or on at least a part thereof.

As suitable specific examples of the above-described heat transport member 53, it is effective to use: a thermal bond that transports heat by directly connecting the heat source and the high-thermal-conductivity member, such as the metal plate 51 etc., with a metal member with high thermal conductivity, such as, for example, copper, aluminium, duralumin, and so forth; a heat pipe that uses a fluid as an intermediate medium; and so forth.

By employing such a configuration, because the heat transport member 53 transports the heat directly from the high-temperature heat source in the nacelle 30 to the outside air, which is a low-heat source, without passing through the air in the nacelle 30, the heat dissipation efficiency from the inside of the nacelle 30 to the outside air is improved further.

In the above-described description, although the heat source in the nacelle 30 is assumed to be the gear box 10, regarding the heat source of high-temperature, it may apply to other high-temperature heat sources, such as, for example, windings in the generator 13, coils in the transformer 14s, and so forth.

Figure 5:
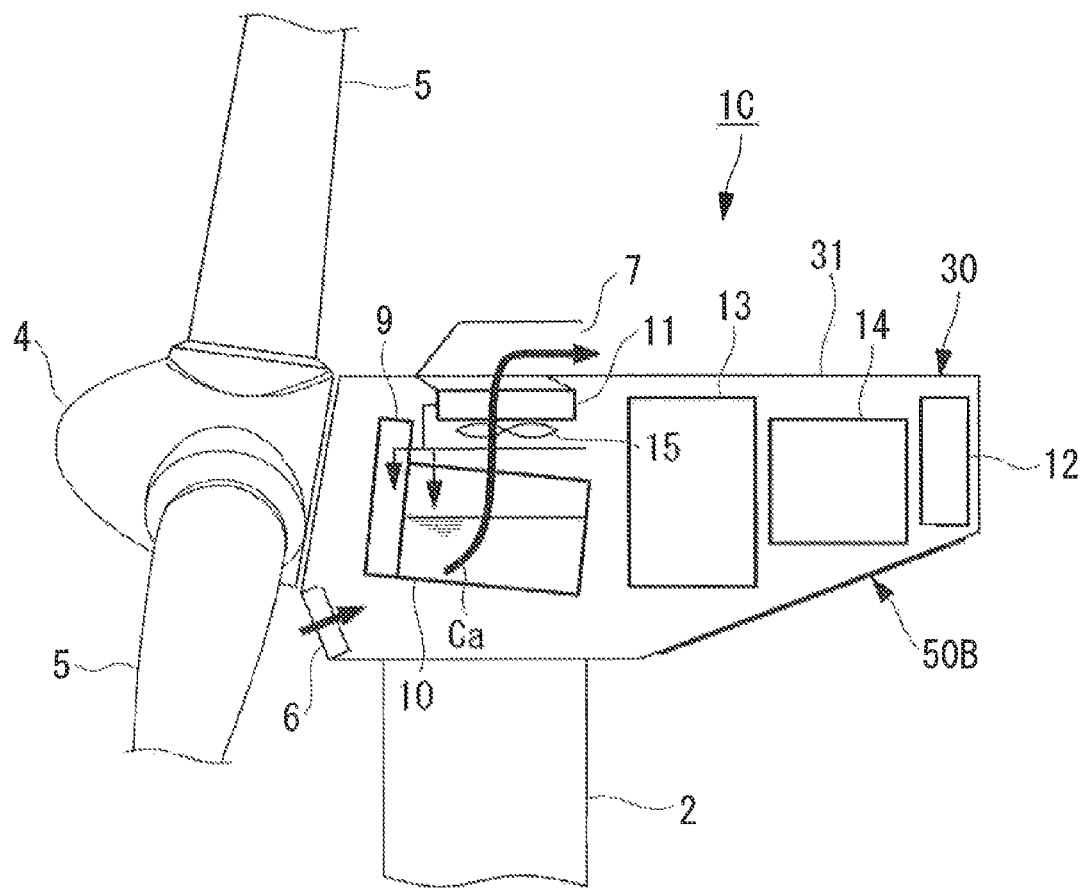
FIG. 5 is a sectional view of relevant portions showing, in outline, an. example internal configuration of a nacelle as a second modification of a wind power generator according to the present invention.
Figure 6A:
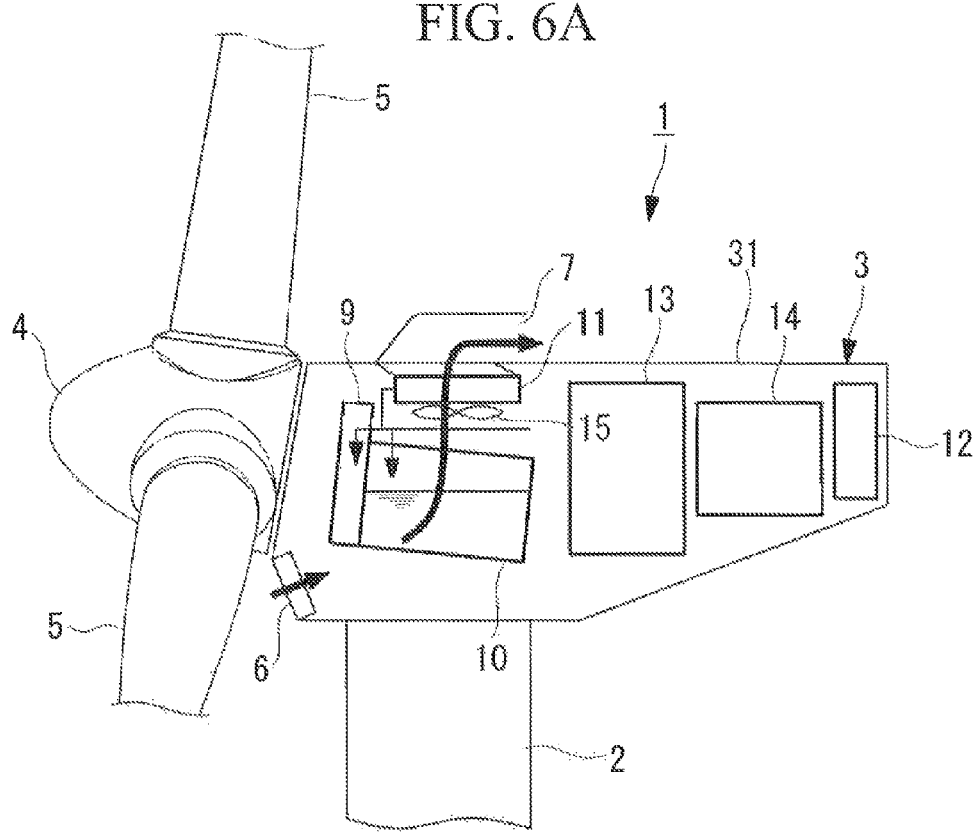
FIG. 6A is a view showing a conventional example related to internal cooling of a nacelle of a wind power generator, and is a sectional view of relevant portions showing, in outline, an example internal configuration of the nacelle.
Figure 6B:
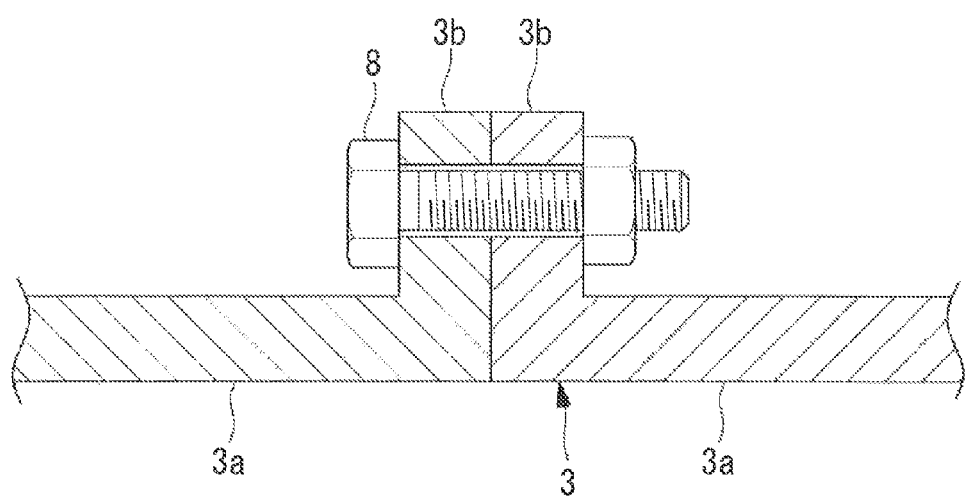
FIG. 6B is a view showing a conventional example related to internal cooling of a nacelle of a wind power generator, and is a sectional view showing an example wall surface cross-sectional structure of a nacelle.

Next, a second, modification of the above-described wind power generator 1A will be explained with reference to FIG. 5. Parts similar to those in the above-described embodiment are assigned the same reference numerals, and a detailed description thereof will be omitted.

In the wind power generator 1C in the second modification, a thin plate with high thermal conductivity, which is formed to have a wave-like shape, is used as the heat-dissipation-resistance reducing portion 50B. In this case, the thin plate is suitably made of a material that is light and that has a high thermal conductivity, such as copper, aluminum, duralumin, high-thermal-conductive resin, and so forth, as described above. By using this plate by forming it into a wave-like shape, it is possible to ensure the necessary rigidity even if a plate-like member having a small plate thickness is used for weight saving.

In addition, the heat-dissipation-resistance reducing portion 50B formed into the wave-like shape has a larger surface area: therefore, it is possible to improve the heat dissipation with the increased heat transporting surface area that dissipates the heat to the outside air.

As described above, the heat-dissipation-resistance reducing portion 50B having the wave-like shape can not only ensure rigidity and achieve weight saving, but can also improve heat dissipation with the increased heat transporting surface area.

In this case, the heat-dissipation-resistance reducing portion 50B may be attached so as to cover either all of the above-described bottom-plate cover member 40 or a part thereof.

As described above, according to the wind, power generator in the above-described embodiment and modifications, by providing the heat-dissipation-resistance reducing portion 50 on the outer wall surface of the nacelle 30, it is possible to suppress the amount of heat input ante the nacelle 30 from the outside of the nacelle due to solar radiation, and to improve the heat dissipation performance from the inside of the nacelle 30 to the outside air. As a result, the air temperature inside the nacelle 30 is maintained so as not to exceed the upper environmental temperature limit, of the electronic equipment by suppressing the temperature rise even in an operating state where the amount of heat input from the sunlight is increased, for example, during a sunny day in summer.

Therefore, various types of electronic equipment that are installed in the nacelle 30 are operated under a suitable temperature environment that does not exceed the upper environmental temperature limit of the electronic equipment, and thus, their reliability and durability are improved.

In addition, by suppressing the temperature rise of the air in the nacelle 30, for example, it is possible to reduce the capacities of the heat exchangers that cool the coolant with the outside air, as with the oil cooler 11 that cools the lubricating oil with the outside air. That is to say, because the temperature of the outside air that is introduced into the nacelle 30 and used for heat exchange is lowered, it is possible to reduce the capacity of the heat exchanger by an amount corresponding to the increase in heat absorption capacity of the outside air.

Because such a size reduction of the heat exchanger is also effective for reducing the amount of outside air required for heat exchange, it is possible to reduce the power of an electric motor required for driving the fan 15 that introduces the outside air, and to improve the power generating efficiency of the wind power generator as a whole.

In addition, the above-described heat-dissipation-resistance reducing portion 50 may also be installed at suitable locations, such as the cover member of the rotor head 4.

Note that, the present invention is not limited to the above-described embodiments, and appropriate modifications are permissible within a range that does not depart from the spirit of the present invention.

REFERENCE SIGNS LIST 1A, 1B, 1C wind power generator
3, 30 nacelle
4 rotor head
5 wind-turbine blade
6 nacelle air inlet
7 air outlet
9 main bearing
10 gear box
11 oil cooler
12 inverter control panel
13 generator
14 transformer
15 fan
31 cover member
32 bottom surface portion
40 bottom-surface cover member
41 peripheral frame
42 flange part
50, 50A, 50B heat-dissipation-resistance reducing portion
51 metal plate
52 fin
53 heat transport member

The invention claimed is:

1. A wind power generator in which a driving mechanism and power generation mechanism linked with a rotor head, to which wind-turbine blades are attached, are accommodated and installed in a nacelle, the wind power generator, comprising:
   an outer wall surface of the nacelle, the outer wall surface including a first wall member which receives direct sunlight and a second wall member which receives no direct sunlight;
   a heat-dissipation-resistance reducing portion including a member having a higher thermal conductivity than that of the first wall member; and,
   wherein at least a part of the second wall member is provided with the heat-dissipation-resistance reducing portion, and wherein the first wall member does not include the heat-dissipation-resistance reducing portion.

2. A wind power generator according to claim 1, wherein the heat-dissipation-resistance reducing portion is provided with a fin that is attached on at least one of the surfaces of the second wall member.

3. A wind power generator according to claim 1, wherein the heat-dissipation-resistance reducing portion is provided with heat transport means that is linked with a heat source installed in the nacelle and carries heat therebetween.

4. A wind power generator according to claim 1, wherein the heat-dissipation-resistance reducing portion is formed into a wave-like shape.

5. A wind power generator in which a driving mechanism and power generation mechanism linked with a rotor head, to which wind-turbine blades are attached, are accommodated and installed in a nacelle, the wind power generator, comprising:
- an outer wall surface of the nacelle, the outer wall surface including a first wall member which receives direct sunlight and a second wall member which receives no direct sunlight;
- a heat-dissipation-resistance reducing portion including a member having a higher thermal conductivity than that of the first wall member; and,
- wherein at least a part of the second wall member is provided with the heat-dissipation-resistance reducing portion.

* * * * *